United States Patent
Fujisawa (10) Patent No.: US 11,498,209 B2
(45) Date of Patent: Nov. 15, 2022

(54) ROBOT CONTROL APPARATUS AND ROBOT CONTROL SYSTEM

(71) Applicant: DAIHEN Corporation, Osaka (JP)

(72) Inventor: Sho Fujisawa, Osaka (JP)

(73) Assignee: DAIHEN CORPORATION

( * ) Notice: Subject to any disclaimer, the term of this patent is extended or adjusted under 35 U.S.C. 154(b) by 184 days.

(21) Appl. No.: 16/946,354

(22) Filed: Jun. 18, 2020

(65) Prior Publication Data
US 2020/0398425 A1    Dec. 24, 2020

(30) Foreign Application Priority Data
Jun. 18, 2019    (JP) .............................. JP2019-112798

(51) Int. Cl.
   *B25J 9/16*    (2006.01)
(52) U.S. Cl.
   CPC .............. *B25J 9/163* (2013.01); *B25J 9/1684* (2013.01); *B25J 9/1697* (2013.01); *G05B 2219/45104* (2013.01)
(58) Field of Classification Search
   CPC ........ B25J 9/163; B25J 9/1684; B25J 9/1697; B25J 9/1602; G05B 2219/45104; G05B 19/425; B23K 9/0953; B23K 9/0956; B23K 9/16; B23K 9/1274
   See application file for complete search history.

(56) References Cited

U.S. PATENT DOCUMENTS

| 4,969,108 A | 11/1990 | Webb et al. |
| 5,534,705 A * | 7/1996 | Terawaki ............. G05B 19/425 |
| | | 219/121.82 |
| 5,887,122 A * | 3/1999 | Terawaki ............. B23K 9/1274 |
| | | 901/42 |

(Continued)

FOREIGN PATENT DOCUMENTS

| JP | 7-129217 A | 5/1995 |
| JP | H10291178 A | 11/1998 |

(Continued)

OTHER PUBLICATIONS

WO-2010003289-A1 (disclosed in IDS) Full Specification Translation (Year: 2010).*

(Continued)

*Primary Examiner* — Abby Y Lin
*Assistant Examiner* — Dylan Brandon Mooney
(74) *Attorney, Agent, or Firm* — Troutman Pepper Hamilton Sanders LLP (57) ABSTRACT

A robot control apparatus for a more precise seam tracking operation, includes: a storage unit in which teaching data is stored; an accepting unit that accepts a sensing result of a laser sensor, from a robot including a working tool and the laser sensor attached to the working tool and configured to detect a shape of a working target before an operation of the working tool; and a control unit that moves the working tool based on the teaching data, corrects the movement of the working tool based on the sensing result, and adjusts an angle about a tool axis such that an operation point indicated by the sensing result is at a center of a field of view of the laser sensor. Accordingly, an operation line can be detected near the center of the field of view of the laser sensor, and thus more precise detection is possible.

5 Claims, 6 Drawing Sheets

(56) References Cited

U.S. PATENT DOCUMENTS

| | | | | |
|---|---|---|---|---|
| 2011/0224815 A1* | 9/2011 | Sonner | ................... | B25J 9/1664 |
| | | | | 700/97 |
| 2011/0238215 A1* | 9/2011 | Yanagawa | ............... | G05B 19/42 |
| | | | | 901/3 |
| 2017/0090431 A1* | 3/2017 | Komatsu | .............. | G05B 19/406 |
| 2017/0220006 A1* | 8/2017 | LoPiccolo | .............. | G05B 11/42 |
| 2020/0269340 A1* | 8/2020 | Tang | ...................... | B25J 9/1697 |
| 2020/0338733 A1* | 10/2020 | Dupuis | ................. | B25J 9/1666 |

FOREIGN PATENT DOCUMENTS

| | | | |
|---|---|---|---|
| JP | 2006331255 A | * | 12/2006 |
| JP | 5502462 B2 | * | 5/2014 |
| KR | 100687814 B1 | | 3/2007 |
| WO | 2010003289 A1 | | 1/2010 |

OTHER PUBLICATIONS

Extended European Search Report dated Dec. 8, 2020 for European Patent Application EP20180290.7.

* cited by examiner

ROBOT CONTROL APPARATUS AND ROBOT CONTROL SYSTEM

CROSS REFERENCE TO RELATED APPLICATION

This application claims priority of Japanese Patent Application No. 2019-112798 filed Jun. 18, 2019. The entire contents of which are hereby incorporated by reference.

FIELD OF THE INVENTION

The present invention relates to a robot control apparatus and the like for moving a working tool based on a sensing result of a laser sensor.

BACKGROUND OF THE INVENTION

When performing welding using robots, target positions may be displaced due to heat strain of workpieces, which results in welding defects. This displacement is solved by detecting a joint position with a laser sensor and adjusting a target position of a robot (welding seam tracking) (see JP 117-129217A, for example).

SUMMARY OF THE INVENTION

However, since the field of view of a laser sensor is limited, if the operation line is curved with a large curvature, the operation line may exit the field of view and it may no longer be possible for the seam tracking operation to continue. The field of view of a laser sensor is a range in which shapes can be detected by the laser sensor (sensing range). For example, the field of view of a laser sensor may be a linear range that is irradiated with a laser beam from the laser sensor.

In JP H7-129217A above, it is possible to perform control such that an angle γ at the position of a tool between a tangent of an operation line (welding seam) and a straight line linking the tool and a laser sensor is a predetermined value. However, since the angle γ at the position of the tool is controlled, for example, when performing a tracking operation such that γ is 0 along a curved operation line with a constant curvature, the field of view is displaced to the outer side of the curve. That is to say, a tracking operation is performed while detecting the position of the operation line in the vicinity of the field of view. Laser sensors typically have properties in which the precision near the center of the field of view is high and the precision in the vicinity thereof is low, and thus a tracking operation that is performed while detecting the position of the operation line in the vicinity of the field of view is problematic in that the precision of the tracking operation accordingly decreases. Furthermore, in the case in which the curvature of an operation line is large, the operation line may exit the field of view.

The present invention was made in order to solve the above-described problems, and it is an object thereof to provide a robot control apparatus and the like capable of, when performing a seam tracking operation using a sensing result of a laser sensor, preventing an operation line from exiting the field of view of the laser sensor and of performing a more precise seam tracking operation.

In order to achieve the above-described object, the present invention is directed to a robot control apparatus including: a storage unit in which teaching data is stored; an accepting unit that accepts a sensing result of a laser sensor, from a robot including a working tool and the laser sensor attached to the working tool and configured to detect a shape of a working target before an operation of the working tool, wherein an angle about a tool axis of the working tool can be adjusted; and a control unit that moves the working tool based on the teaching data, corrects the movement of the working tool based on the sensing result, and adjusts the angle about the tool axis such that an operation point indicated by the sensing result is at a center of a field of view of the laser sensor.

With this configuration, a seam tracking operation can be performed such that an operation line such as a seam is at the center of the field of view of the laser sensor. Thus, even in the case in which an operation line is curved with a large curvature, it is possible to prevent the operation line from exiting the field of view. Furthermore, since the position of the operation line can be detected in an area in which the laser sensor can exert the highest level of precision, it is possible to realize a more precise seam tracking operation.

Furthermore, the robot control apparatus according to the present invention may have a configuration in which the control unit performs feedback control containing an integral action such that the operation point indicated by the sensing result is at the center of the field of view of the laser sensor.

With this configuration, when performing a seam tracking operation along a curved operation line with a constant curvature, it is possible to improve the trackability of feedback control for setting the operation line at the center of the field of view of the laser sensor.

Furthermore, the robot control apparatus according to the present invention may have a configuration in which the feedback control is PID control.

With this configuration, the feedback control contains a differential action. Accordingly, when the curvature of the operation line significantly changes (e.g., when the plus sign and the minus signs of the curvature are switched), it is possible to improve the trackability of feedback control for setting the operation line at the center of the field of view of the laser sensor.

Furthermore, the robot control apparatus according to the present invention may have a configuration in which, when adjusting the angle about the tool axis, the control unit adjusts the angle within a range up to a preset upper limit.

With this configuration, the angle is adjusted within a predetermined range, and thus it is possible to prevent problems caused by, for example, sudden angle adjustment.

Furthermore, the present invention is directed to a robot control system including the robot control apparatus, and the robot that is controlled by the robot control apparatus.

With the robot control apparatus and the like according to the present invention, an angle about a tool axis is adjusted such that an operation line is at the center of the field of view of a laser sensor, and thus, even in the case in which the curvature of the operation line is large, it is possible to prevent the operation line from exiting the field of view, and of performing a more precise seam tracking operation.

DETAILED DESCRIPTION OF THE INVENTION

Hereinafter, a robot control system and a robot control apparatus according to the present invention will be described based on an embodiment. Note that constituent elements or steps denoted by the same reference numerals are the same as or similar to each other in the following embodiments, and thus a description thereof may not be repeated. The robot control apparatus according to this embodiment adjusts an angle about a tool axis such that an operation line is at the center of the field of view of a laser sensor in a seam tracking operation.

Figure 1:
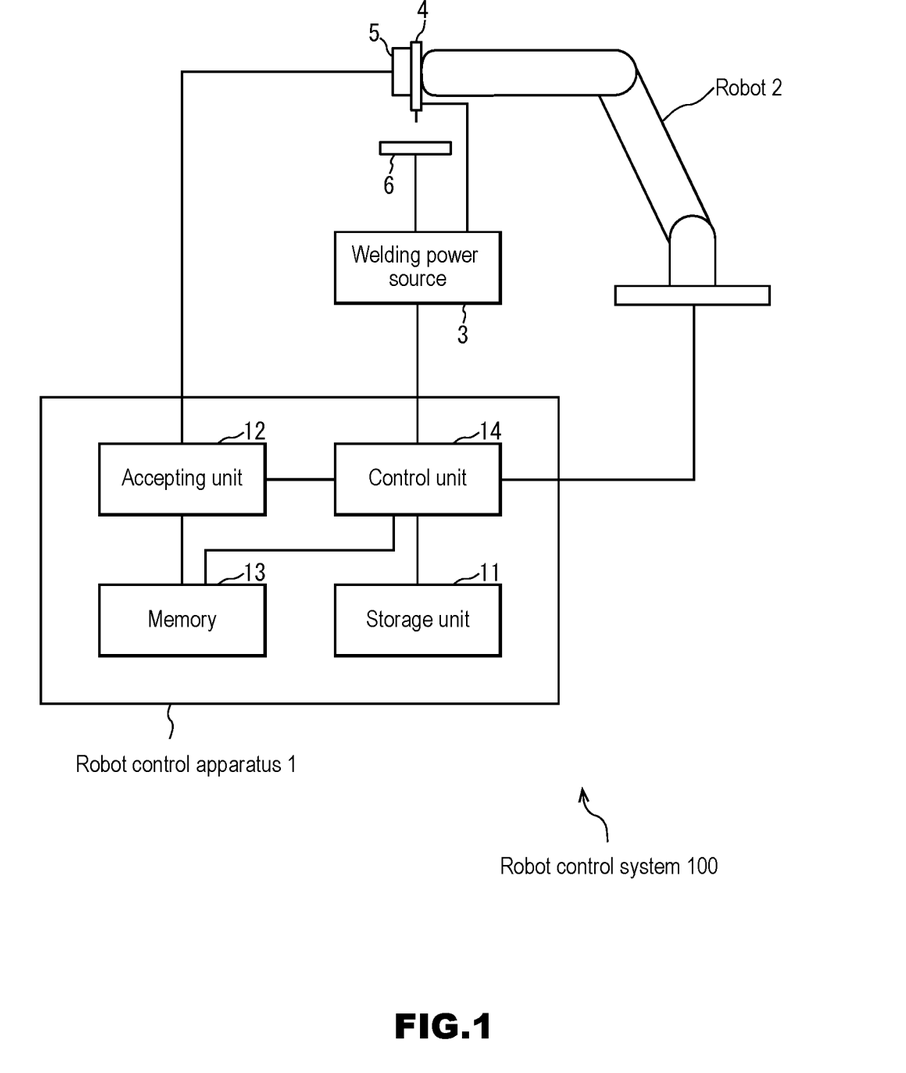
FIG. 1 is a schematic diagram showing the configuration of a robot control apparatus according to an embodiment of the present invention.

FIG. 1 is a block diagram showing the configuration of a robot control system 100 according to this embodiment. The robot control system 100 according to this embodiment includes a robot control apparatus 1, a robot 2, and a welding power source 3.

The robot control apparatus 1 controls the robot 2 and the welding power source 3. The robot 2 has a manipulator having multiple arms coupled to each other via joints that are driven by a motor, and an end of the manipulator has a working tool 4 and a laser sensor 5 that detects the shape of a working target (workpiece) 6 before an operation of the working tool 4. In the robot 2, an angle about a tool axis of the working tool 4 can be adjusted. The tool axis may be, for example, a longitudinal axis at the front end of the working tool 4. If the working tool 4 is a welding torch, the tool axis may be, for example, a longitudinal axis of a welding wire at the front end of the working tool 4. It is assumed that the laser sensor 5 is attached to the working tool 4. Accordingly, it is possible to rotate the sensing range of the laser sensor 5 about the tool axis of the working tool 4, by adjusting the angle about the tool axis of the working tool 4. There is no particular limitation on the robot 2, but examples thereof may include a vertical articulated robot. If the robot 2 is a vertical articulated robot, there is no limitation on the number of axes, but it may be six, or seven or more. In order to adjust the angle about the tool axis of the working tool 4 without changing the posture of the working tool 4, it is preferable that the robot 2 is a vertical articulated robot with seven or more axes in which redundant solutions can be used. The manipulator of the robot 2 may have, for example, a rotating shaft that can rotate the working tool 4 about the tool axis.

The laser sensor 5 may be a laser sensor that irradiates the working target 6 with a linear laser beam and captures the laser beam, thereby measuring the distance along multiple sampling points to the working target 6. The laser sensor 5 may be a scanning laser sensor that performs scanning in a linear manner, thereby measuring the distance along multiple sampling points to the working target 6. Hereinafter, a linear laser beam with which the working target 6 is irradiated, or a linear trajectory of irradiation points of a laser beam with which the working target 6 is irradiated may be referred to as an irradiation line. The irradiation line is typically in the form of a straight line. With the laser sensor 5, for example, it is possible to acquire the shape of a welding point such as a groove. In this embodiment, a case will be mainly described in which the working tool 4 is a welding torch, and an operation that is performed with the working tool 4 is welding. The configuration of the robot 2 including the working tool 4 and the laser sensor 5 is already known, and thus a detailed description thereof has been omitted.

The welding power source 3 supplies a high voltage that is used in welding, to the working tool (welding torch) 4 and the workpiece 6. If a welding wire is used in welding, the welding power source 3 may perform control regarding supply of the welding wire. The configuration of the welding power source 3 is already known, and thus a detailed description thereof has been omitted.

The robot control apparatus 1 controls the robot 2 to perform a tracking operation based on a sensing result of the laser sensor 5. As shown in FIG. 1, the robot control apparatus 1 includes a storage unit 11, an accepting unit 12, a memory 13, and a control unit 14.

Teaching data is stored in the storage unit 11. It is assumed that the teaching data indicates a movement path (e.g., a position, a posture, etc.) of the working tool 4 of the robot 2. The teaching data may also contain information regarding welding conditions such as a start point or an end point of welding, a welding current, a welding voltage, and the like.

There is no limitation on the procedure in which information is stored in the storage unit 11. For example, information may be stored in the storage unit 11 via a storage medium, information transmitted via a communication line or the like may be stored in the storage unit 11, or information input via an input device may be stored in the storage unit 11. For example, teaching data input using a teaching pendant or the like connected to the robot control apparatus 1 may be stored in the storage unit 11. In the storage unit 11, information may be temporarily stored in a RAM or the like, or may be stored for a long period of time. The storage unit 11 can be realized by any storage medium (e.g., a semiconductor memory, a magnetic disk, etc.).

The accepting unit 12 accepts a sensing result of the laser sensor 5 from the robot 2, and accumulates information according to the sensing result in the memory 13. The information that is accumulated in the memory 13 may be information at predetermined intervals. The sensing result of the laser sensor 5 may be, for example, distances in the height direction from multiple points on an irradiation line in the working target 6 (e.g., distances from the laser sensor 5 to the working target 6). The sensing result may be acquired by a two-dimensional or three-dimensional imaging sensor (e.g., a CCD array, etc.). The sensing result is typically information at multiple sampling points indicating the shape of the working target 6, and thus the accepting unit 12 may create the shape of the working target 6 from the sensing result, and acquire a position at which an operation is to be performed by the working tool 4, for example, a position of an operation line (welding seam), using the created shape. This position may be hereinafter referred to as a feature point position. For example, when welding a lap joint, the position of a step portion indicated by the sensing result is a feature point position. For example, when welding a butt joint, the position of a groove indicated by the sensing result is a feature point position.

Furthermore, since the sensing result indicates a position in a coordination system of the laser sensor 5, the accepting unit 12 may convert the position in the coordination system into a position in a predetermined reference coordination system. The reference coordination system may be, for example, the coordination system of the robot 2. Thus, the accepting unit 12 may accept the position and the posture in a reference coordination system of the working tool 4, from the control unit 14, and may acquire a feature point position in the reference coordination system using the accepted position and posture, and the sensing result. The posture of the working tool 4 may contain the angle about the tool axis. The information according to the sensing result that is accumulated in the memory 13 may be, for example, information indicating the feature point position in the reference coordination system, the sensing result itself, or other information according to the sensing result. In this embodiment, a case will be mainly described in which the information according to the sensing result is information indicating the feature point position in the reference coordination system. When used in later-described adjustment of an angle about a tool axis, for example, information indicating the feature point position in the coordination system of the laser sensor 5 may also be accumulated in the memory 13.

Information that is used in a tracking operation is temporarily stored in the memory 13. Specifically, as described above, information according to the sensing result is stored in the memory 13.

The control unit 14 moves the working tool 4 based on the teaching data stored in the storage unit 11, and corrects the movement of the working tool 4 based on the sensing result of the laser sensor 5. The correction of the movement of the working tool 4 based on the sensing result may be performed using the information according to the sensing result stored in the memory 13. In this manner, so-called tracking correction is performed. More specifically, the control unit 14 calculates a targeted position and a targeted posture of the working tool 4 based on the teaching data, before movement of the working tool 4. The targeted position and the targeted posture may be calculated, for example, through interpolation of a teaching position or a teaching posture contained in the teaching data. The calculated targeted position and targeted posture indicate information regarding movement of the working tool 4, that is, a time-series change in the position and the posture of the working tool 4. The control unit 14 calculates the current position and posture of the working tool 4, for example, based on the angle of each joint read from an encoder or the like of the manipulator of the robot 2. This information may be delivered to the accepting unit 12 as described above. The control unit 14 may read the information according to the sensing result from the memory 13, calculate a targeted position and a targeted posture of the working tool 4 according to the read information, and replace the targeted position and the targeted posture calculated from the teaching data with the targeted position and the targeted posture calculated from the information according to the sensing result. If it is difficult to perform movement from the current position and posture to the targeted position and the targeted posture calculated based on the information according to the sensing result (e.g., a change in the position or the posture is a change by a predetermined threshold value or more, etc.), a targeted position and a targeted posture between the targeted position and the targeted posture calculated based on the teaching data and the targeted position and the targeted posture calculated based on the information according to the sensing result may be newly created, and the targeted position and the targeted posture calculated based on the teaching data may be replaced with the newly created information. The control unit 14 may control the robot 2 such that the working tool 4 is at the targeted position and the targeted posture, using the current position and posture of the working tool 4 and the targeted position and the targeted posture. In this manner, the tracking correction is performed. The control of the angle about the tool axis of the working tool 4 will be described later. It is also possible that the tracking correction is performed using method other than that described above, as long as tracking correction is eventually performed based on the sensing result. The tracking correction is already known, and thus a detailed description thereof has been omitted. If the control unit 14 reads the information according to the sensing result from the memory 13, the information may be deleted from the memory 13. The control unit 14 may instruct the welding power source 3 to start or end welding, or may output welding conditions to the welding power source 3, based on the teaching data.

In the above-described seam tracking operation, control is performed according to the targeted posture. The targeted posture determines an angle such as a targeted angle and a travel angle of the working tool 4 relative to the workpiece 6. The targeted angle may be an angle formed by a reference plane containing an operation line and a plane containing the operation line and the longitudinal axis of the working tool 4 (which may be, for example, the longitudinal axis at the front end of the working tool 4 such as a welding wire). The travel angle may be an angle formed by a normal line of the operation line and the longitudinal axis of the working tool 4, on the plane containing the operation line and the longitudinal axis of the working tool 4. Accordingly, the angle about the tool axis can be changed independently of the targeted posture, and thus the control unit 14 adjusts the angle about the tool axis such that the operation point indicated by the sensing result is at the center of the field of view of the laser sensor 5. The operation point is a point at which an operation is performed by the working tool 4, and is a point on an operation line such as a seam. For example, the intersection between the operation line and the irradiation line of the laser sensor 5 is an operation point. In this embodiment, a case will be described in which the above-described feature point is an operation point.

Figure 3:
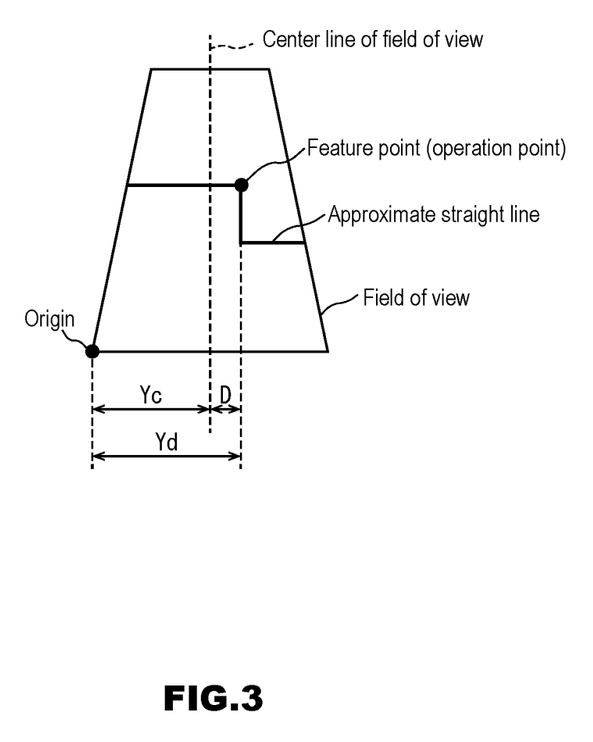
FIG. 3 is a diagram showing an example of a sensing result of a laser sensor according to the embodiment.

FIG. 3 is a diagram showing an example of a sensing result of the laser sensor 5. It is assumed that, in FIG. 3, the direction in which the irradiation line extends is referred to as a left-right direction. In FIG. 3, the shape of the working target 6 estimated based on positions of multiple sampling points acquired by the laser sensor 5 is indicated by an approximate straight line. Also, in the shape of the working target 6 indicated by the approximate straight line, an angle that is closer to the laser sensor 5 than the other is at the step portion is taken as a feature point. Accordingly, for example, the feature point position is indicated by the information stored in the memory 13. In the field of view of the laser sensor 5, if the origin is taken as shown in FIG. 3, the control unit 14 can acquire a length Yd in the left-right direction from the origin to the feature point, using the information stored in the memory 13. For example, the control unit 14 may acquire the length Yd using the origin position and the feature point position in the reference coordination system. Since a length Yc in the left-right direction from the origin to the center line of the field of view is determined in advance, the control unit 14 can acquire a distance D in the left-right direction from the center of the field of view to the feature point, as in the following equation. In FIG. 3, if the feature point is located on the right side of the center line of the field of view, the distance D has a positive value, and if the feature point is located on the left side, the distance D has a negative value.

$$D = Yd - Yc$$

Figure 4:
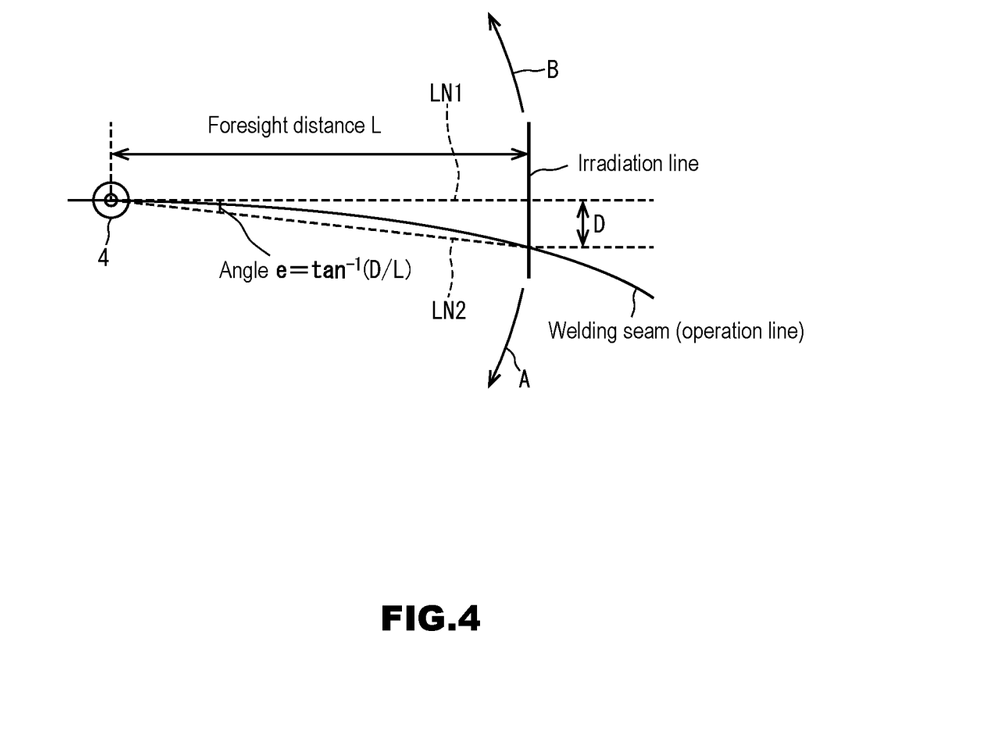
FIG. 4 is a diagram illustrating adjustment of an angle about a tool axis according to the embodiment.

It is sufficient that the control unit 14 adjusts the angle about the tool axis such that the distance D is 0. FIG. 4 is a diagram illustrating adjustment of the angle about the tool axis. FIG. 4 is a diagram illustrating the working tool 4, the irradiation line of the laser sensor 5, the operation line, and the like such that the tool axis of the working tool 4 is perpendicular to the section of the diagram. A foresight distance L is a distance between the position of the front end of the working tool 4 and the irradiation position of the laser sensor 5. When an angle formed between a straight line LN1 linking the front end of the working tool 4 and the center line of the field of view of the laser sensor 5 (the center of the irradiation line) and a straight line LN2 linking the front end of the working tool 4 and a feature point (operation point) according to the sensing result is taken as an angle e, the angle e can be calculated as in the following equation, using the foresight distance L and the distance D from the center of the field of view to the operation point. If the feature point is located on the upper side of a straight line linking the front end of the working tool 4 and the center line of the field of view of the laser sensor 5, the angle e has a negative value.

$$e = \tan^{-1}(D/L)$$

Since the angle e indicates displacement of an angle caused by displacement of an operation point detected through sensing from the center of the field of view, this angle may be referred to as a displacement angle e. Accordingly, the control unit 14 controls the angle about the tool axis of the working tool 4 such that the displacement angle e is 0. When the working tool 4 is rotated about the tool axis, the irradiation line (the field of view) moves in the direction of the arrow A or the arrow B in FIG. 4. Accordingly, in FIG. 4, it is sufficient that the working tool 4 is rotated about the tool axis in a direction in which the displacement angle e becomes 0, that is, such that the irradiation line moves in the direction of the arrow A. Through this control, the angle about the tool axis is adjusted such that the operation point indicated by the sensing result is at the center of the field of view of the laser sensor 5. The control unit 14 may perform feedback control such that the operation point indicated by the sensing result is at the center of the field of view of the laser sensor 5. Specifically, feedback control may be performed that sets the displacement angle e to 0.

There is no limitation on the content of the feedback control, but, for example, it may contain a proportional action. The feedback control may contain, for example, an integral action. The feedback control containing an integral action may be, for example, PI control or PID control. If an integral action is contained, even in the case of performing a seam tracking operation along a curved operation line with a constant curvature, it is possible to improve the trackability of feedback control for setting the operation line at the center of the field of view of the laser sensor 5. The feedback control may contain, for example, a differential action. The feedback control containing a differential action may be, for example, PID control. If a differential action is contained, even in the case in which the curvature of the operation line significantly changes (e.g., the plus sign and the minus signs of the curvature are switched as in an undulating curve), it is possible to improve the trackability of feedback control for setting the operation line at the center of the field of view of the laser sensor 5.

When adjusting the angle about the tool axis, the control unit 14 may adjust the angle within a range up to a preset upper limit. The upper limit may be, for example, an upper limit of the angle in one rotation (i.e., an upper limit regarding the amount of change in the angle in one time of control). If such an upper limit is provided, it is possible to perform smooth angle adjustment by preventing the angle about the tool axis from suddenly changing. The upper limit may be, for example, an upper limit of a cumulative angle. If such an upper limit is provided, it is possible to prevent the angle about the tool axis from being an angle that is mechanically impossible, thereby preventing damage to a motor and the like of the manipulator of the robot 2.

Figure 5A:
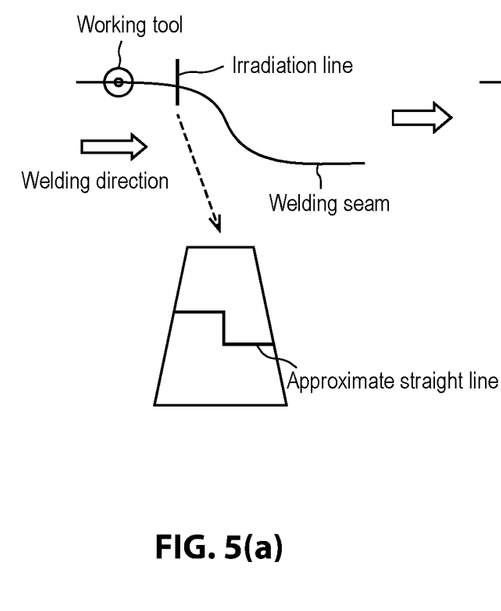
FIGS. 5(a) and 5(b) are diagrams illustrating a problem of a conventional seam tracking operation.
Figure 5B:
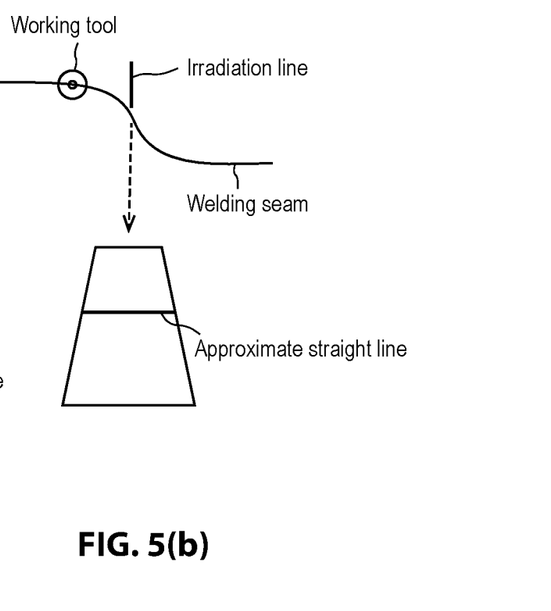

Hereinafter, the effects of the control unit 14 adjusting the angle about the tool axis such that the angle e is 0 will be described. FIGS. 5(a) and 5(b) are diagrams illustrating a seam tracking operation according to a conventional example in which adjustment of the angle about the tool axis is not performed. In the case in which adjustment of the angle about the tool axis is not performed, as shown in FIG. 5(a), the field of view of a laser sensor contains an operation line (welding seam) in an operation (welding) along a substantially straight portion of the operation line, and thus an appropriate seam tracking operation can be performed. Meanwhile, as shown in FIG. 5(b), the operation line exits the field of view when the operation line has a large curvature, resulting in a problem that the seam tracking operation cannot be continued. On the other hand, as in the robot control apparatus 1 according to this embodiment, if the control unit 14 rotates the working tool 4 about the tool axis such that the angle e is 0, the operation line can be at the center of the field of view of the laser sensor 5. As a result, even in the case in which the operation line has a large curvature, the operation line can be prevented from exiting the field of view, resulting in an advantage that the seam tracking operation can be continued.

Figure 6A:
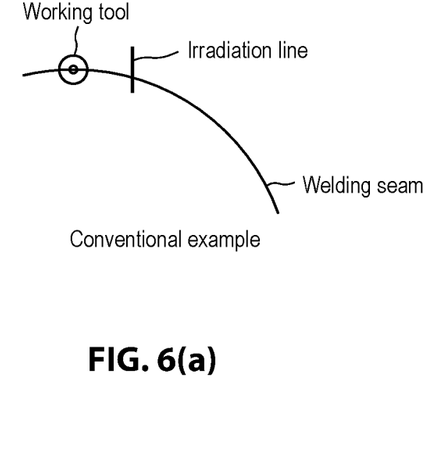
FIGS. 6(a) and 6(b) are diagrams comparing a seam tracking operation according to a conventional example and a seam tracking operation according to the embodiment.
Figure 6B:
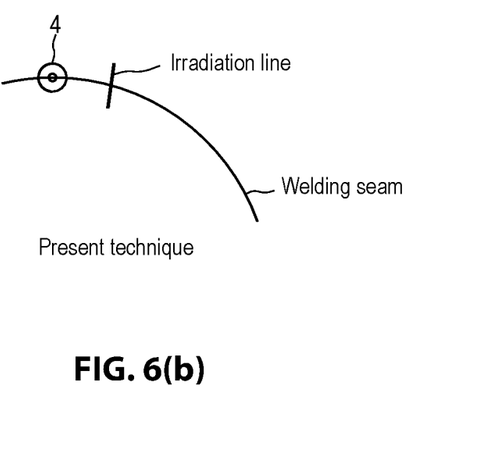

Also with the technique of JP H7-129217A, it is possible to make the field of view of a laser sensor follow the operation line, by setting as appropriate the angle γ at the position of the working tool. However, as described above, in JP H7-129217A, control is performed such that the angle γ at the position of a tool between a tangent of an operation line (welding seam) and a straight line linking the tool and the laser sensor is a predetermined value. Thus, as shown in FIG. 6(a), when performing a seam tracking operation such that γ is 0 along an operation line (welding seam) with a constant curvature, the position of the operation line is detected in the vicinity of the field of view of the laser sensor. As described above, laser sensors have properties in which the sensing precision is higher near the center of the field of view, and thus, when the operation line is detected in the vicinity of the field of view, the precision accordingly decreases. On the other hand, with the robot control apparatus 1 according to this embodiment, as shown in FIG. 6(b), the angle about the tool axis of the working tool 4 is controlled such that the operation line is at the center of the field of view of the laser sensor 5. Thus, it is possible to detect the position of the operation line near the center of the field of view in which the level of precision is higher, and to realize a seam tracking operation with a higher level of precision than the conventional example (JP H7-129217A). With the robot control apparatus 1 according to this embodiment, control is performed such that the operation line is at the center of the field of view of the laser sensor 5, and thus, even in the case in which the operation line is subsequently displaced to either side of the field of view, it is possible to easily make the field of view follow the operation line.

The storage unit 11 and the memory 13 are typically realized by different storage media, but there is no limitation to this. For example, a configuration is possible in which, in a storage medium, an area is used as the storage unit 11 and another area is used as the memory 13.

Next, an operation of the robot control apparatus 1 will be described with reference to the flowchart in FIG. 2.

(Step S101) The accepting unit 12 judges whether or not to accept a sensing result. If a sensing result is to be accepted, a sensing result from the laser sensor 5 is accepted and the procedure advances to step S102, and, if otherwise, the procedure advances to step S104. For example, the accepting unit 12 may judge to accept a sensing result at predetermined intervals.

(Step S102) The accepting unit 12 acquires information according to the sensing result accepted from the laser sensor 5. This information may be, for example, information indicating the position of a feature point (operation point) in the reference coordination system.

(Step S103) The accepting unit 12 accumulates the information acquired in step S102, in the memory 13. The procedure then returns to step S101.

(Step S104) The control unit 14 judges whether or not to move the working tool 4. If it moves the working tool 4, the procedure advances to step S105, and, if otherwise, the procedure then returns to step S101. For example, the control unit 14 may regularly judge to move the working tool 4.

(Step S105) The control unit 14 acquires the distance D from the center of the field of view of the laser sensor 5 to the operation point (feature point), using the information stored in the memory 13.

(Step S106) The control unit 14 calculates the displacement angle e about the tool axis of the working tool 4, using the distance D acquired in step S105.

(Step S107) The control unit 14 controls the movement of the working tool 4, based on the teaching data stored in the storage unit 11 and the information according to the sensing result stored in the memory 13. The control unit 14 performs control for adjusting the angle about the tool axis such that the displacement angle e calculated in step S106 is 0. Through this control, the working tool 4 of the robot 2 is moved to the targeted position and the targeted posture. Furthermore, the operation line is controlled to be at the center of the field of view of the laser sensor 5. The control unit 14 may perform control regarding an operation of the working tool 4. Specifically, the control unit 14 may control the start and the end of welding, a welding voltage, a welding current, and the like, by controlling the welding power source 3. The procedure then returns to step S101. The series of operations on the working target 6 are performed by repeating the processing in step S107.

Figure 2:
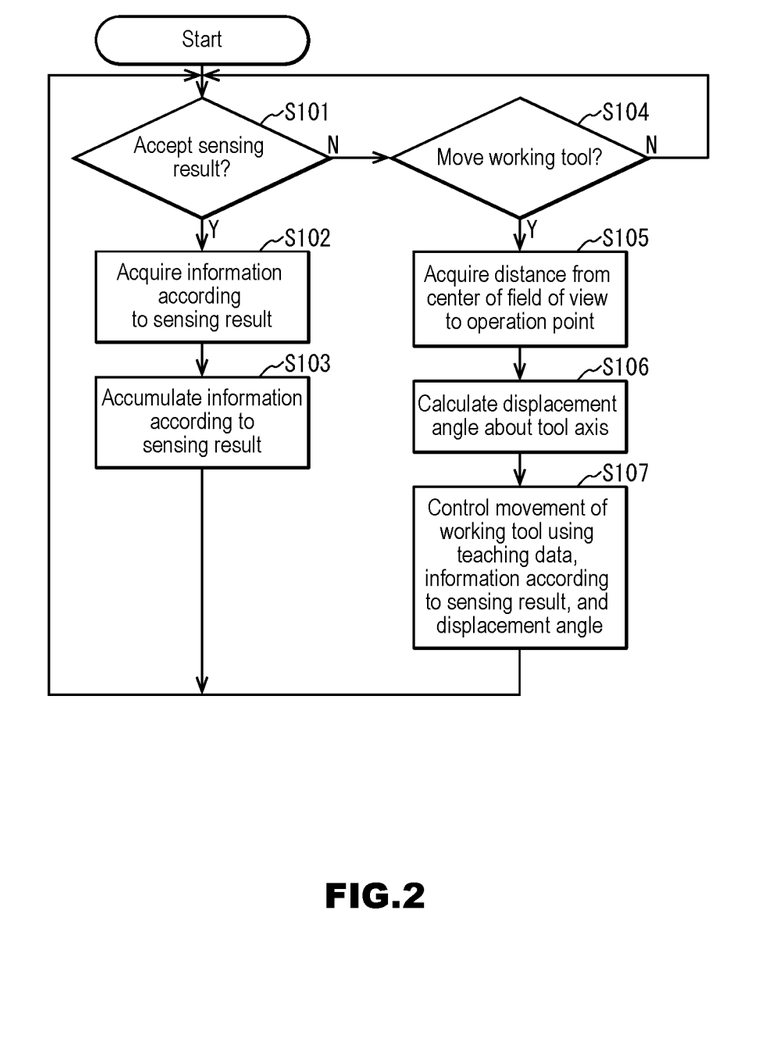
FIG. 2 is a flowchart showing an operation of the robot control apparatus according to the embodiment.

In the flowchart in FIG. 2, steps S105 and S106 always have the same result unless a new sensing result is accepted, and thus, for example, a configuration is possible in which, when the intervals for judging to move the working tool 4 in step S104 are shorter than sensing intervals, the processing in steps S105 and S106 is performed only if new sensing is performed, and a previous calculation result is used if otherwise. The order of the steps in the flowchart in FIG. 2 is merely an example, and may be changed as long as similar results may be obtained. In the flowchart in FIG. 2, the processing ends at power off or at an interruption of ending processing. For example, when the series of operations by the working tool 4 are ended, the procedure in the flowchart in FIG. 2 may be ended.

As described above, with the robot control apparatus 1 according to this embodiment, a seam tracking operation can be performed such that the operation line is at the center of the field of view of the laser sensor 5. Accordingly, even in the case in which the curvature of the operation line is large, it is possible to prevent the operation line from exiting the field of view. Since the sensing precision is highest near the center of the field of view of the laser sensor 5, the position of the operation line can be more precisely detected, and thus it is possible to realize a more precise tracking operation. Furthermore, in an operation such as welding, the position and the posture of the working tool 4 are determined according to the operation, but the limitations regarding the posture are those regarding the targeted angle or the travel angle, and, typically, the angle about the tool axis can be controlled independently of the targeted angle and the travel angle. Accordingly, the robot control apparatus 1 according to this embodiment can adjust the angle about the tool axis of the working tool 4 such that the operation line is at the center of the field of view of the laser sensor 5, without lowering the level of precision of the operation.

Furthermore, in the foregoing embodiment, the case was described in which the tracking operation is welding, but it is also possible that the tracking operation is an operation other than welding. There is no particular limitation on the tracking operation other than welding, and examples thereof include seam tracking operations such as sealing and deburring. If the tracking operation is sealing, the working tool may be a sealing gun (caulking gun) or the like. If the tracking operation is deburring, the working tool may be a deburring unit or the like. If the tracking operation is not welding, the robot control system 100 need not include the welding power source 3.

Furthermore, in the foregoing embodiment, each process or each function may be realized as centralized processing using a single apparatus, or may be realized as distributed processing using multiple apparatuses.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown storage medium temporarily or for a long period of time even if not specified in the description above. Furthermore, the information may be accumulated in the unshown storage medium by each constituent element or by an unshown accumulating unit. Furthermore, the information may be read from the unshown storage medium by each constituent element or by an unshown reading unit.

Furthermore, in the foregoing embodiment, if information used in each constituent element or the like, for example, information such as a threshold value, an address, or various setting values used in each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The change instruction may be accepted by the unshown accepting unit, for example, by accepting information from an input device, by receiving information transmitted via a communication line, or by accepting information read from a predetermined storage medium.

Furthermore, in the foregoing embodiment, if two or more constituent elements included in the robot control apparatus 1 have a communication device, an input device, or the like, the two or more constituent elements may have a physically single device, or may have different devices.

Furthermore, in the foregoing embodiment, each constituent element may be configured by dedicated hardware, or alternatively, constituent elements that can be realized by software may be realized by executing a program. For example, each constituent element may be realized by a program execution unit such as a CPU reading and executing a software program stored in a storage medium such as a hard disk or a semiconductor memory. At the time of executing the program, the program execution unit may execute the program while accessing the storage unit or the storage medium. Furthermore, this program may be executed by downloading from a server or the like, or may be executed by reading a program stored in a predetermined storage medium (e.g., an optical disk, a magnetic disk, a semiconductor memory, etc.). Furthermore, the program may be used as a program forming a program product. Furthermore, a computer that executes the program may be a single computer or may be multiple computers. That is to say, centralized processing may be performed, or distributed processing may be performed.

The present invention is not limited to the embodiment set forth herein. Various modifications are possible within the scope of the invention.

As described above, the robot control apparatus and the like according to the present invention has the effect of making it possible to realize a more precise seam tracking operation, and thus this apparatus is useful as a robot control apparatus and the like for controlling a robot that performs a seam tracking operation.

What is claimed is:

1. A robot control apparatus comprising:
a storage unit in which teaching data is stored;
an accepting unit that accepts a sensing result of a laser sensor, from a robot including a working tool and the laser sensor attached to the working tool and configured to detect a shape of a working target before an operation of the working tool, wherein an angle about a tool axis of the working tool can be adjusted; and
a control unit that moves the working tool based on the teaching data, corrects the movement of the working tool based on the sensing result, and adjusts the angle about the tool axis such that an operation point indicated by the sensing result is at a center of a field of view of the laser sensor.

2. The robot control apparatus according to claim 1, wherein the control unit performs feedback control containing an integral action such that the operation point indicated by the sensing result is at the center of the field of view of the laser sensor.

3. The robot control apparatus according to claim 2, wherein the feedback control is PID control.

4. The robot control apparatus according to claim 1, wherein, when adjusting the angle about the tool axis, the control unit adjusts the angle within a range up to a preset upper limit.

5. A robot control system comprising: a robot control apparatus; comprising:
a storage unit in which teaching data is stored,
an accepting unit that accepts a sensing result of a laser sensor, from a robot including a working tool and the laser sensor attached to the working tool, and configured to detect a shape of a working target before an operation of the working tool, wherein an angle about a tool axis of the working tool can be adjusted, and
a control unit that moves the working tool based on the teaching data, corrects the movement of the working tool based on the sensing result, and adjusts the angle about the tool axis such that an operation point indicated by the sensing result is at a center of a field of view of the laser sensor; and the robot that is controlled by the robot control apparatus.

* * * * *